United States Patent
Yang et al.

(10) Patent No.: US 8,601,636 B2
(45) Date of Patent: Dec. 10, 2013

(54) WINDSHIELD WIPER COMBINING ASSEMBLY OF COMBINING DRIVEN WIPER ARM

(75) Inventors: Chih-Ming Yang, Taipei (TW); Chuan-Chih Chang, Taipei (TW)

(73) Assignee: Danyang UPC Auto Parts Co., Ltd., Danyang (CN)

(*) Notice: Subject to any disclaimer, the term of this patent is extended or adjusted under 35 U.S.C. 154(b) by 136 days.

(21) Appl. No.: 13/310,076

(22) Filed: Dec. 2, 2011

(65) Prior Publication Data

US 2013/0007976 A1 Jan. 10, 2013

(30) Foreign Application Priority Data

Jul. 6, 2011 (CN) .................. 2011 2 0236005 U

(51) Int. Cl.
*B60S 1/40* (2006.01)
(52) U.S. Cl.
USPC ........................................ 15/250.32
(58) Field of Classification Search
USPC ............. 15/250.32, 250.361, 250.43, 250.44, 15/250.31, 250.201
See application file for complete search history.

(56) References Cited

U.S. PATENT DOCUMENTS 7,337,489 B2 * 3/2008 Huang .................. 15/250.32
2006/0064838 A1 * 3/2006 Poton .................. 15/250.32

* cited by examiner

*Primary Examiner* — Gary Graham
(74) *Attorney, Agent, or Firm* — Chun-Ming Shih; HDLS IPR Services

(57) ABSTRACT

A windshield wiper combining assembly assembles a driven wiper arm having a through shaft on a windshield wiper fixing stage. The windshield wiper combining assembly includes an assembling stage and a retaining stage. The assembling stage engages on the windshield wiper fixing stage. The assembling stage has a first fastening arm, a containing groove formed at one side edge of the assembling stage to contain the through shaft, and an engaging groove arranged at one side edge of the containing groove. The retaining stage has a cover cap and a block which projects on an end surface of the cover cap. The retaining stage is combined on the assembling stage by fastening the first fastening arm. The block is plunged into the engaging groove and the cover cap is pressed on the containing groove to prevent loose attachment of the through shaft.

9 Claims, 9 Drawing Sheets

WINDSHIELD WIPER COMBINING ASSEMBLY OF COMBINING DRIVEN WIPER ARM

BACKGROUND OF THE INVENTION

1. Field of the Invention

The present invention relates generally to a windshield wiper configuration, and more particularly to a windshield wiper combining assembly of combining a driven wiper arm.

2. Description of Prior Art

In general, a windshield wiper for a vehicle is installed on a vehicle window of the vehicle. The windshield wiper is connected to a driven wiper arm of the vehicle and the windshield wiper is repeatedly wiped on the vehicle window by applying force on the windshield wiper via the driven wiper arm.

The available windshield wiper on the market mainly includes an assembling stage, a fixing stage, and a supporting rack. The supporting rack installs rubber-made wiper blades on a bottom surface of the supporting rack. The supporting rack is assembled on a bottom surface of the fixing stage and the assembling stage is installed on a top surface of the fixing stage so that the driven wiper arm of the vehicle can be installed on the assembling stage. Accordingly, the wiper blades assembled on the supporting rack is provided to wipe water and dirt attached on the vehicle window by repeatedly swishing the windshield wiper driven by the driven wiper arm back and forth.

The combination configuration of the prior art windshield wiper is usually formed by embedding or engaging the driven wiper arm and the assembling stage. The combination configuration of the driven wiper arm and the assembling stage is used for a period of time, however, it is easily to produce loose attachment of the two components. Accordingly, the driven wiper arm would not reliably press wiper blades so that wiper blades could not tightly contact on the vehicle window.

Accordingly, it is desirable to provide a windshield wiper combining assembly of combining a driven wiper arm to overcome the above-mentioned disadvantages.

SUMMARY OF THE INVENTION

An object of the present invention is to provide a windshield wiper combining assembly of combining a driven wiper arm so that the driven wiper arm can be firmly combined on the windshield wiper combining stage.

In order to achieve the above-mentioned objects, the present invention discloses a windshield wiper combining assembly of combining a driven wiper arm to assemble the driven wiper arm having a through shaft on a windshield wiper fixing stage. The windshield wiper combining assembly includes an assembling stage and a retaining stage.

The assembling stage engages on the windshield wiper fixing stage. The assembling stage has a first fastening arm, a containing groove which is formed at one side edge of the assembling stage to contain the through shaft, and an engaging groove which is arranged at one side edge of the containing groove.

The retaining stage has a cover cap and a block which projects on an end surface of the cover cap. The retaining stage is combined on the assembling stage by fastening the first fastening arm.

The block is plunged into the engaging groove and the cover cap is pressed on the containing groove to prevent loose attachment of the through shaft from the containing groove when the retaining stage is pushed to make the cover cap abut the containing groove.

Another object of the invention is to provide a windshield wiper combining assembly of combining a driven wiper arm so that two side edges of the driven wiper arm are fastened at two sides of the assembling stage to prevent the driven wiper arm from sway and position deviation.

Comparing with the prior art, the through shaft of the driven wiper arm of the present invention is arranged in the assembling stage and the retaining stage is positioned on the assembling stage. The block is plunged into the engaging groove and the cover cap is pressed on the containing groove to prevent loose attachment of the through shaft from the containing groove when the retaining stage is pushed to make the cover cap abut the containing groove. Therefore, the driven wiper arm can be firmly assembled on the assembling stage.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
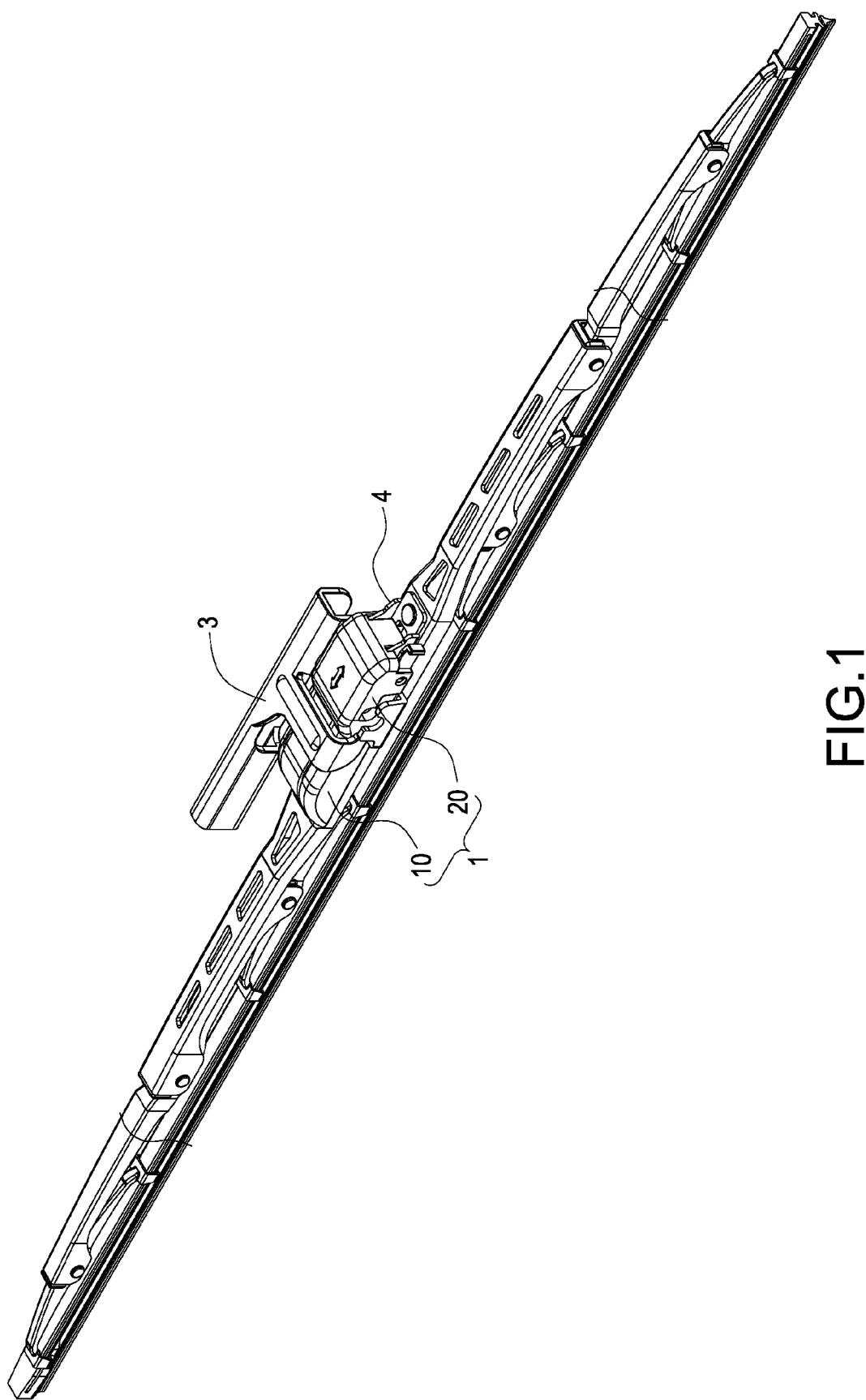
FIG. 1 is a schematic view of using a windshield wiper combining assembly according to the present invention.

Reference will now be made to the drawing figures to describe the present invention in detail. Although the present invention has been described with reference to the preferred embodiment thereof, it will be understood that the invention is not limited to the details thereof.

Figure 2:
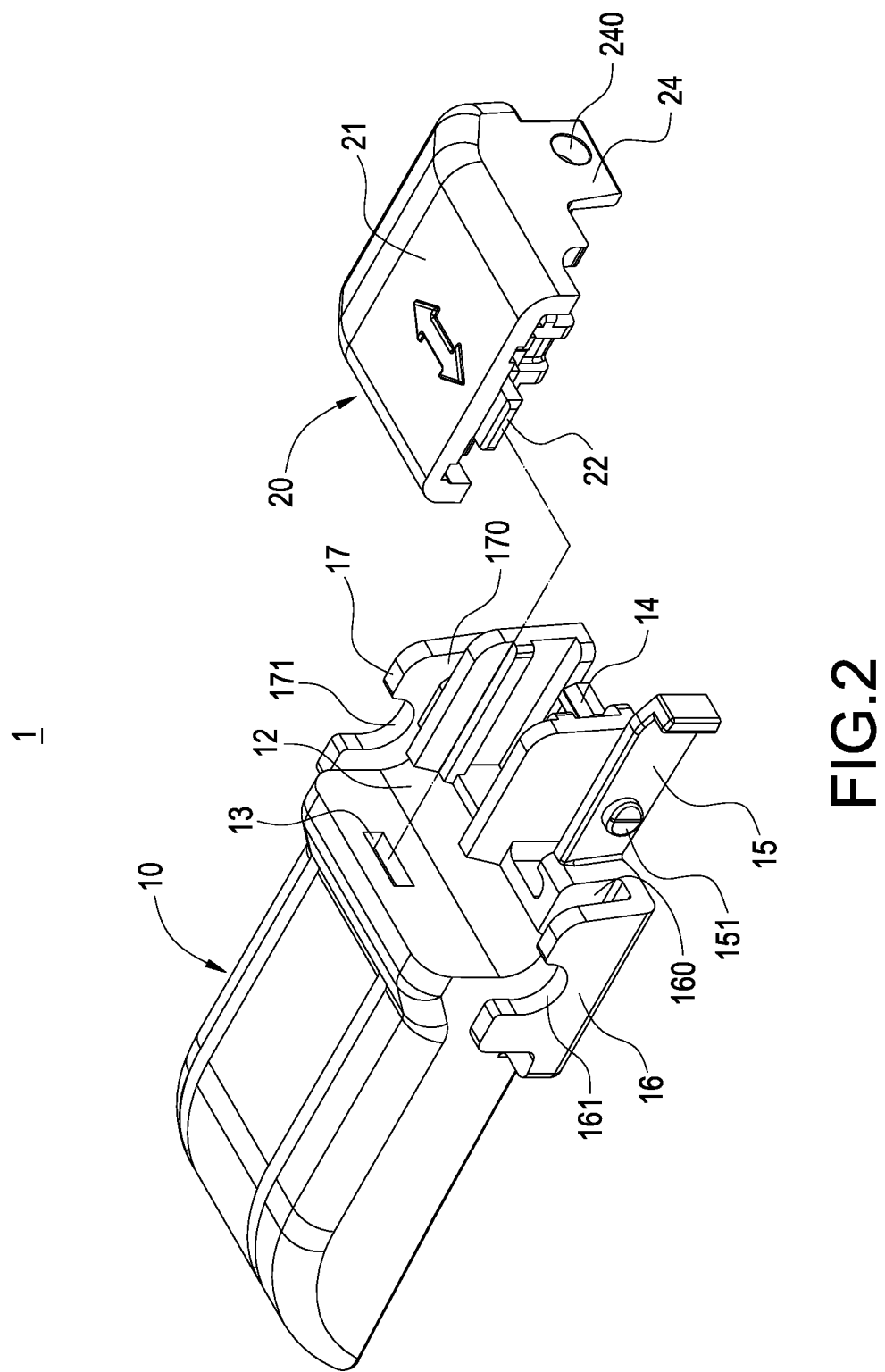
FIG. 2 is a first schematic perspective assembled view of the windshield wiper combining assembly according to the present invention.
Figure 3:
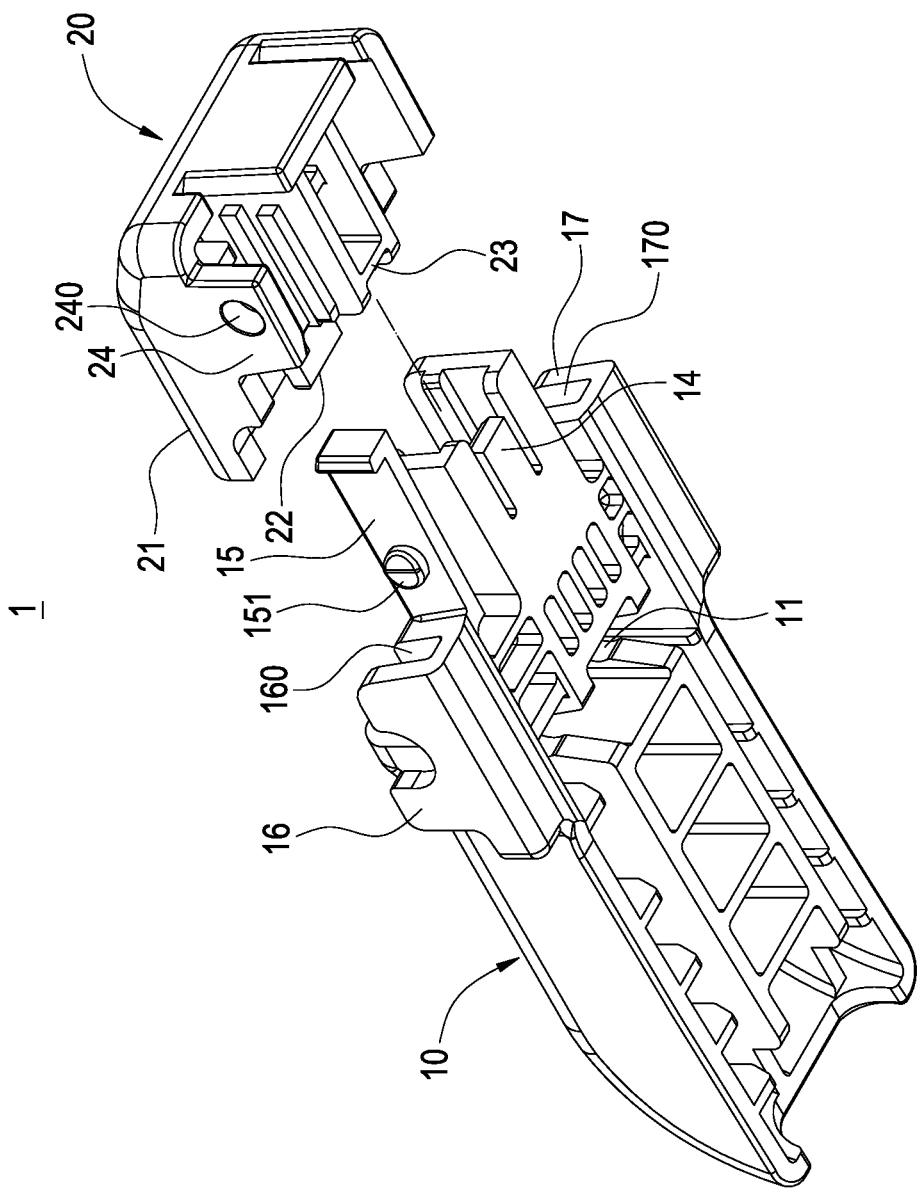
FIG. 3 is a second schematic perspective assembled view of the windshield wiper combining assembly according to the present invention.
Figure 4:
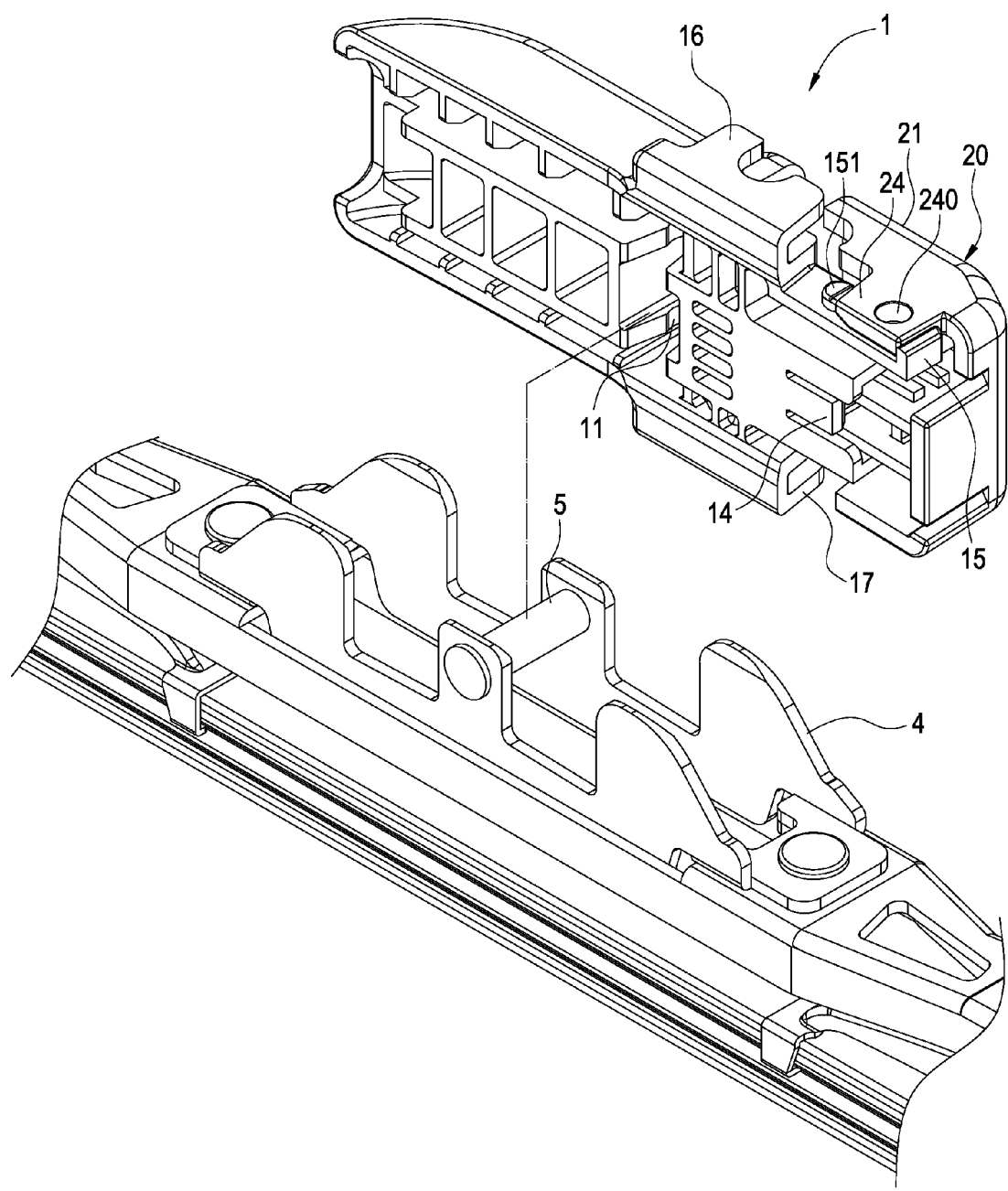
FIG. 4 is a schematic assembled view of the windshield wiper combining assembly and a windshield wiper fixing stage according to the present invention.
Figure 5:
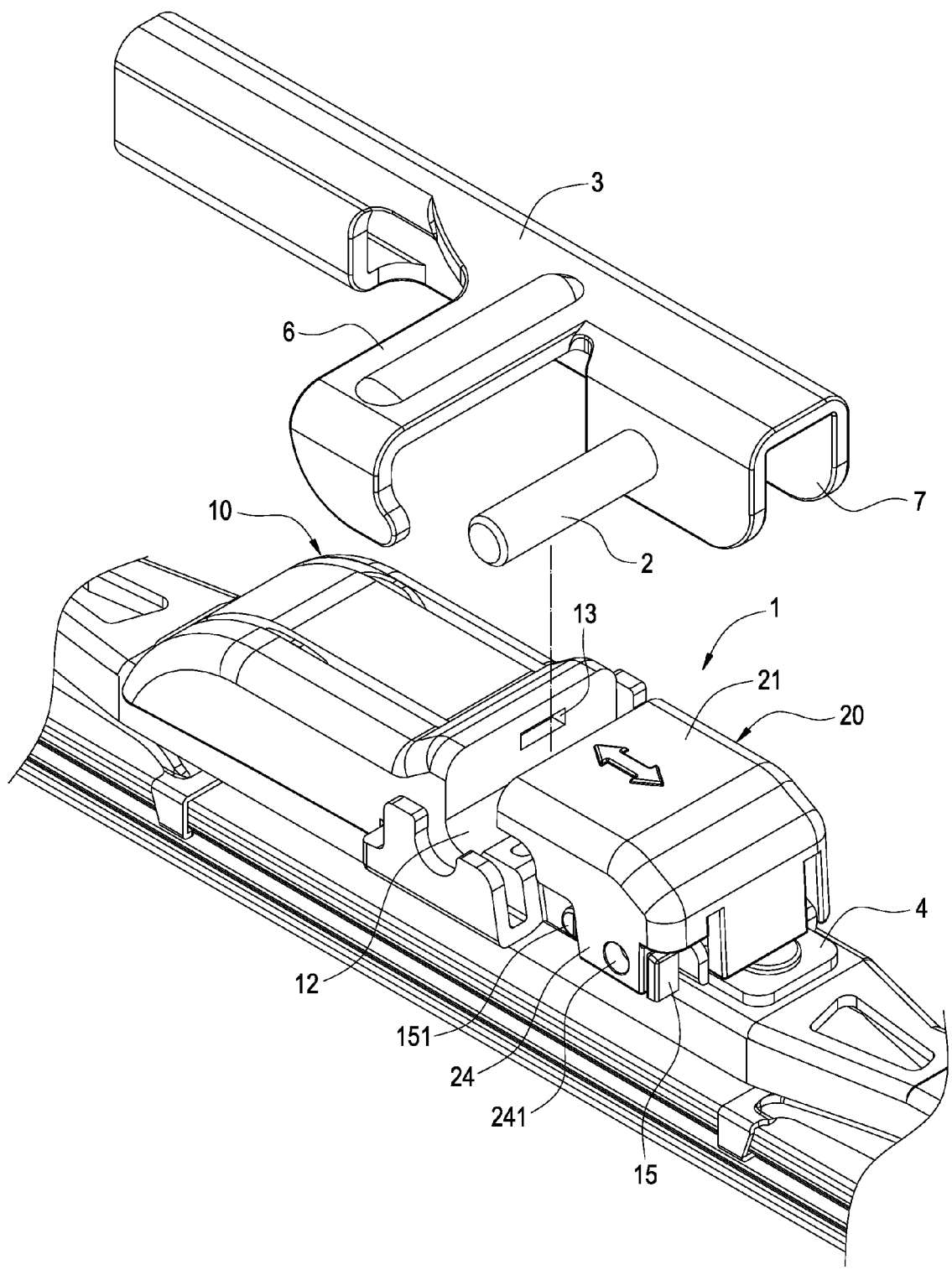
FIG. 5 is a schematic view of combining the windshield wiper combining assembly to a driven wiper arm according to the present invention.

Reference is made from FIG. 1 to FIG. 5 which are a schematic view of using a windshield wiper combining assembly, a first and a second schematic perspective assembled views of the windshield wiper combining assembly, a schematic assembled view of the windshield wiper combining assembly and a windshield wiper fixing stage, and a schematic view of combining the windshield wiper combining assembly to a driven wiper arm according to the present invention, respectively. The present invention discloses a windshield wiper combining assembly of combining the driven wiper arm. The windshield wiper combining assembly 1 assemblies a driven wiper arm 3 with a through shaft 2 on the windshield wiper fixing stage 4. The windshield wiper combining assembly 1 includes an assembling stage 10 and a retaining stage 20.

The assembling stage 10 has a fastening groove 11 which is engaged on the windshield wiper fixing stage 4. The fastening groove 11 is formed on a bottom surface of the assembling stage 10 to fasten the assembling stage 10 on the windshield wiper fixing stage 4. A containing groove 12 is formed from one side edge of the assembling stage 10 and an engaging groove 13 is arranged at one side edge of the containing groove 12. The containing groove 12 is provided to contain the through shaft 2. In addition, the assembling stage 10 has a first fastening arm 14 and a second fastening arm 15. The first fastening arm 14 is arranged at an outer side of the containing groove 12. The second fastening arm 15 is an elastic arm and the second fastening arm 15 is formed at one side edge of the first fastening arm 14 to laterally fasten the retaining stage 20.

The retaining stage 20 has a cover cap 21 and a block 22 which projects on an end surface of the cover cap 21. The retaining stage 20 forms a retaining wall 23 on a bottom surface of the cover cap 21 and the first fastening arm 14 fastens on the retaining wall 23. In addition, the retaining stage 20 perpendicularly extends a positioning block 24 at a side edge of the cover cap 21 and the second fastening arm 15 is fastened on the positioning block 24. The retaining stage 20 is fastened by the first fastening arm 14 and the second fastening arm 15 to be provisionally positioned on the assembling stage 10.

Furthermore, the second fastening arm 15 has a positioning button 151 and the positioning block 24 has a positioning hole 240 which is corresponded to the positioning button 151. The assembling stage 10 outwardly extends a first retaining wing 16 from one side edge of the assembling stage 10. A first gap 160 is formed between the first retaining wing 16 and an outer surface of the assembling stage 10. The first retaining wing 16 has a first through hole 161 which is corresponded to the containing groove 12. Similarly, the assembling stage 10 outwardly extends a second retaining wing 17 from the other side edge of the assembling stage 10. A second gap 170 is formed between the second retaining wing 17 and the outer surface of the assembling stage 10. The second retaining wing 17 has a second through hole 171 which is corresponded to the containing groove 12.

The driven wiper arm 3 has an extending arm 6 and a fastening frame 7 which are corresponded to the windshield wiper combining assembly 1. Steps of combining the windshield wiper combining assembly 1 to the driven wiper arm 3 are described as follows. First, the assembling stage 10 is engaged on a pivot 5 of the windshield wiper fixing stage 4, thus combining the assembling stage 10 and the retaining stage 20 on the windshield wiper fixing stage 4. Afterward, the through shaft 2 of the driven wiper arm 3 is arranged in parallel in the containing groove 12. At this time, the extending arm 6 is inserted in parallel in the first gap 160 and a side edge of the fastening frame 7 is inserted in parallel in the second gap 170.

Figure 6:
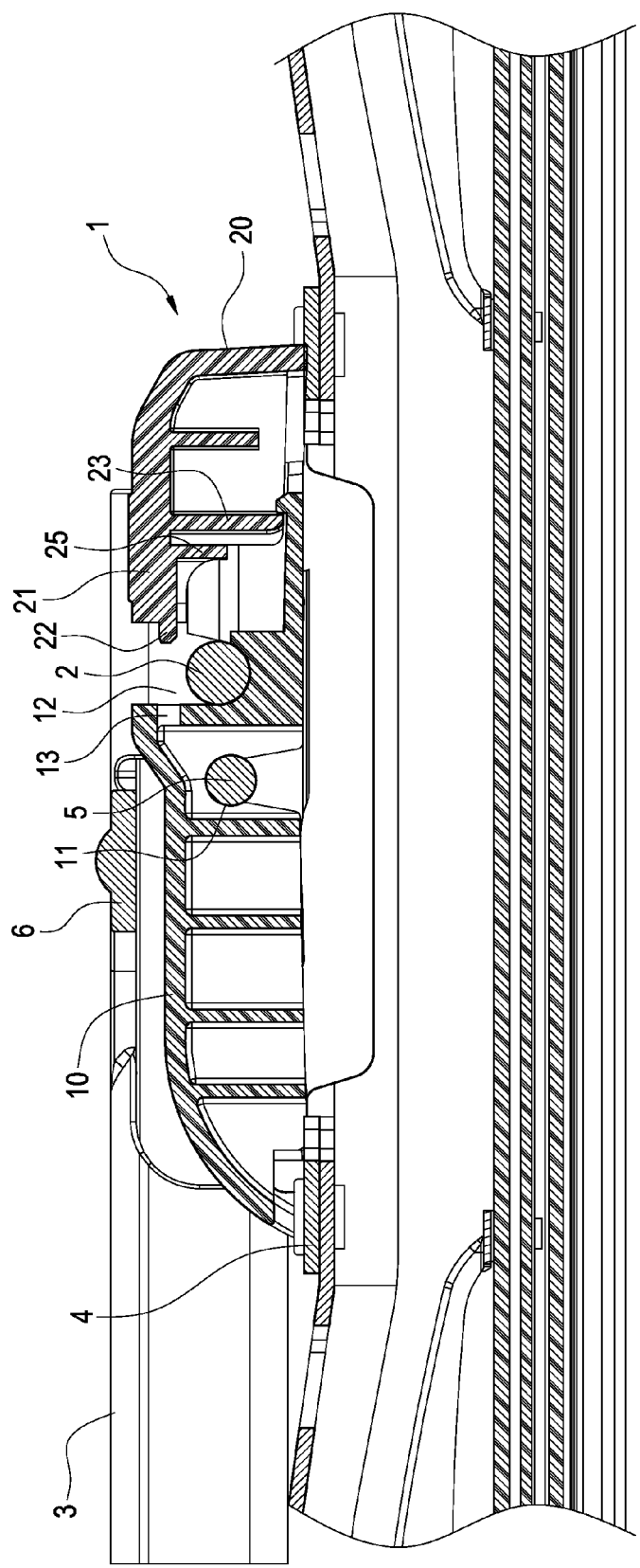
FIG. 6 is a cross-sectional view of combining the windshield wiper combining assembly according to the present invention.
Figure 7:
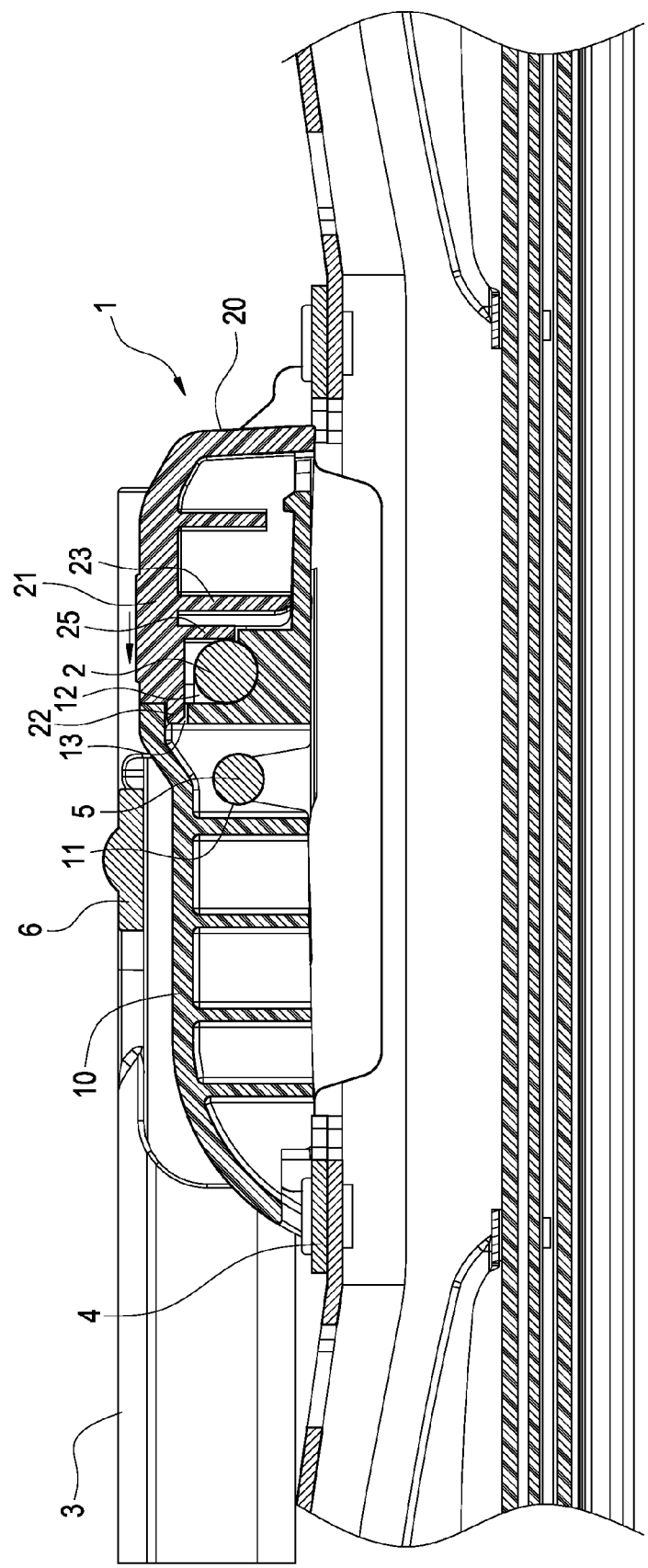
FIG. 7 is a schematic view of pushing the windshield wiper combining assembly according to the present invention.
Figure 8:
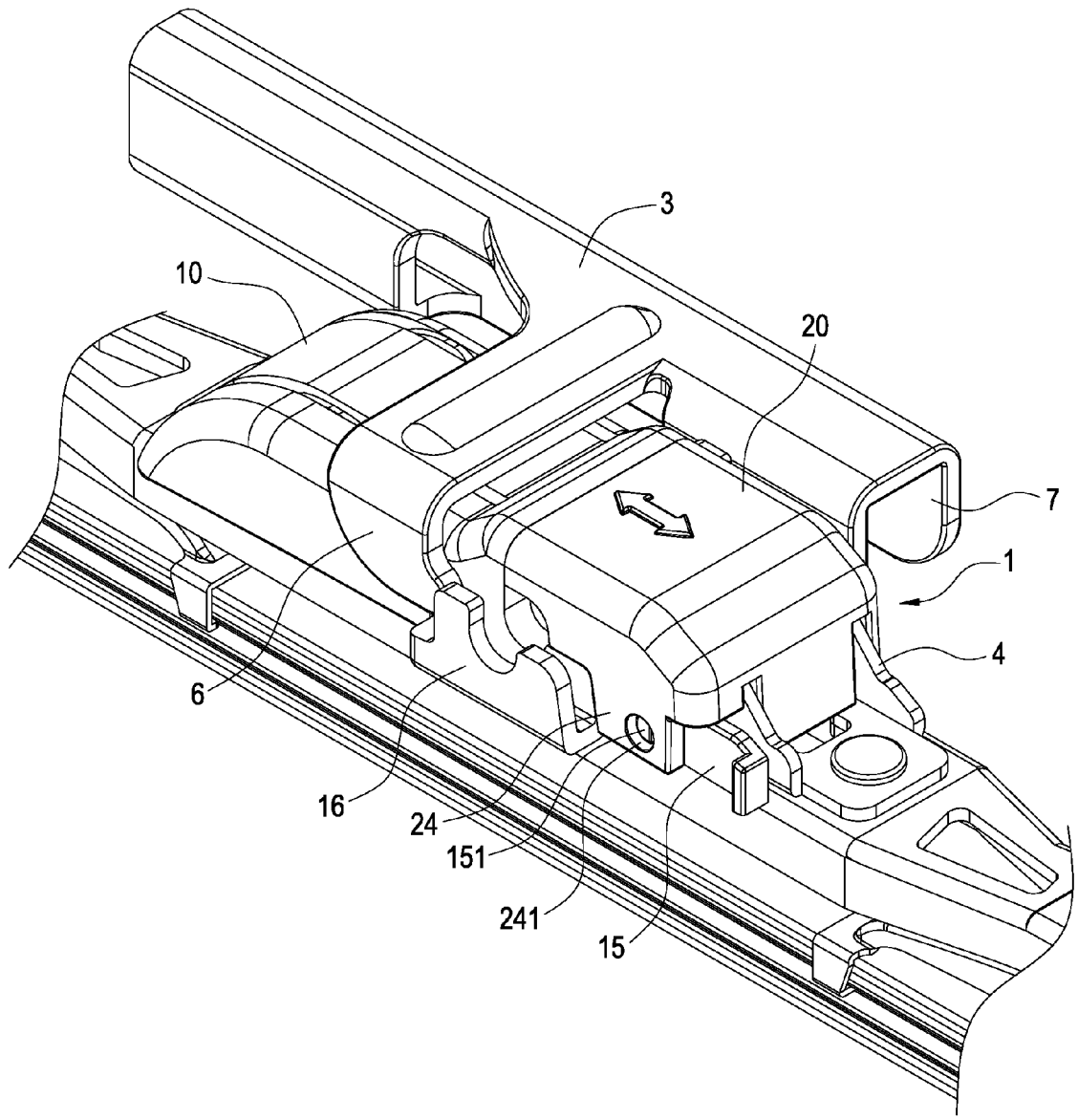
FIG. 8 is a first schematic view of completely combining the windshield wiper combining assembly to the driven wiper arm according to the present invention.
Figure 9:
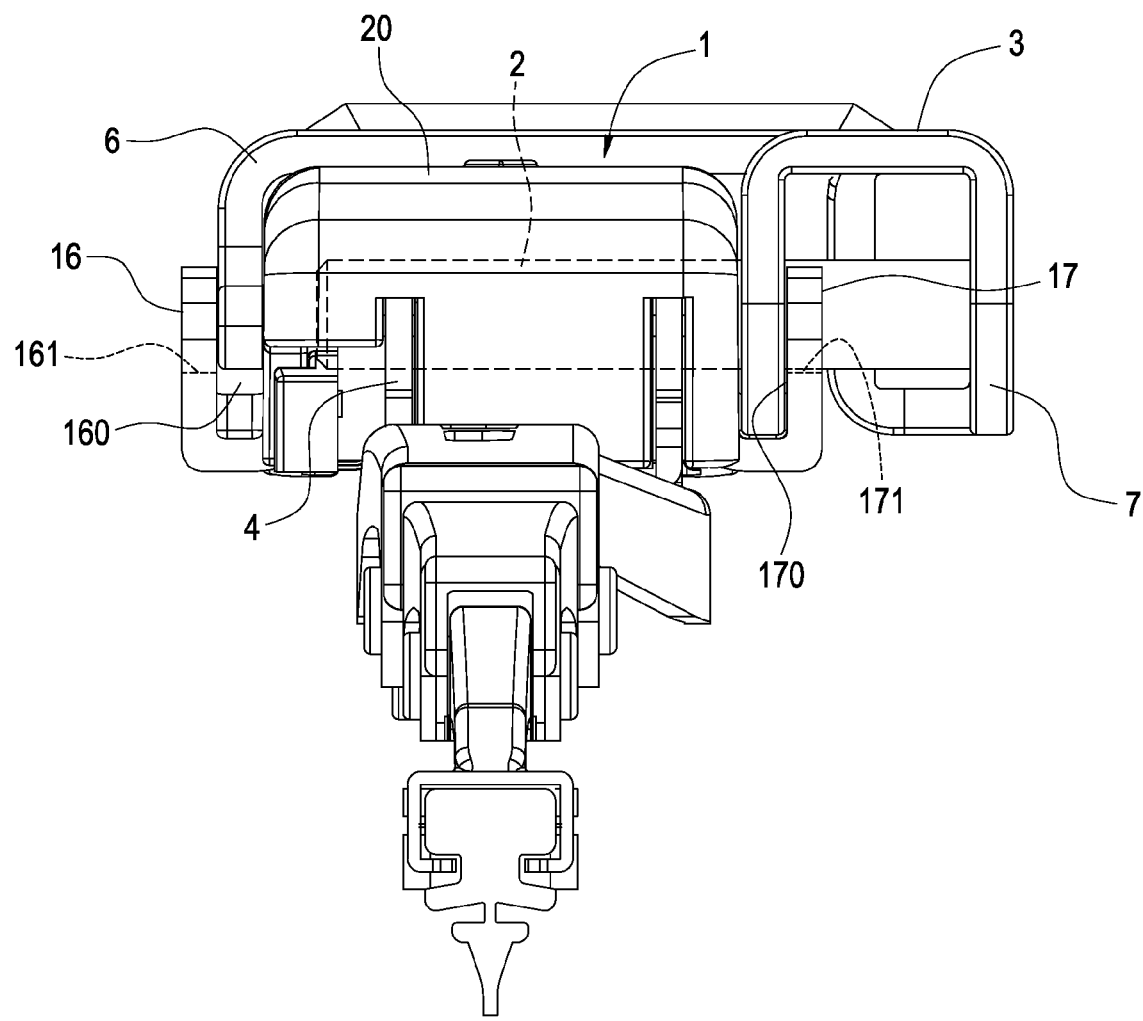
FIG. 9 is a second schematic view of completely combining the windshield wiper combining assembly to the driven wiper arm according to the present invention.

Reference is made from FIG. 6 to FIG. 9 which are a cross-sectional view of combining the windshield wiper combining assembly, a schematic view of pushing the windshield wiper combining assembly, and a first and a second schematic views of tightly combining the windshield wiper combining assembly to the driven wiper arm according to the present invention. After combining the assembling stage 10, the retaining stage 20, and the driven wiper arm 3 on the windshield wiper fixing stage 4, the retaining stage 20 is pushed so that the retaining wall 23 of the retaining stage 20 is moved from an outer side of the first fastening arm 14 to an inner side of the first fastening arm 14. In this case, the cover cap 21 is pressed on the containing groove 12 and the block 22 is plunged into the engaging groove 13. At this time, the positioning button 151 is fastened in the positioning hole 240 to position the retaining stage 20 on the assembling stage 10. The cover cap 21 covers on the containing groove 12 so that the through shaft 2 of the driven wiper arm 3 is abutted by the retaining stage 20 to prevent loose attachment of the through shaft 2 of the driven wiper arm 3 from the containing groove 12.

Furthermore, the retaining stage 20 forms a cover plate 25 on a bottom surface of the cover cap 21. When the cover cap 21 presses on the containing groove 12, the cover plate 25 moves to one side edge of the containing groove 12, thus abutting the through shaft 2 not to be loosened from the containing groove 12. In addition, two side edges of the driven wiper arm 3 (namely, the extending arm 6 and the fastening frame 7) are limited at inner sides of the first retaining wing 16 and the second retaining wing 17, respectively, so as to prevent the driven wiper arm 3 from sway and position deviation.

It is to be understood that both the foregoing general description and the following detailed description are exemplary, and are intended to provide further explanation of the invention as claimed. Other advantages and features of the invention will be apparent from the following description, drawings and claims.

What is claimed is:

1. A windshield wiper combining assembly, the combining assembly assembling a driven wiper arm having a through shaft on a windshield wiper fixing stage; the windshield wiper combining assembly comprising:

an assembling stage engaging on the windshield wiper fixing stage, the assembling stage having a first fastening arm, a containing groove formed at one side edge of the assembling stage to contain the through shaft, and an engaging groove arranged at one side edge of the containing groove; and a retaining stage having a cover cap and a block projecting on an end surface of the cover cap, the retaining stage combined on the assembling stage by fastening the first fastening arm;

wherein, the block is plunged into the engaging groove and the cover cap is pressed on the containing groove to prevent loose attachment of the through shaft from the containing groove when the retaining stage is pushed to make the cover cap abut against the containing groove, wherein the assembling stage has a fastening groove that is fastened on the windshield wiper fixing stage, and the fastening groove is formed on a bottom surface of the assembling stage, wherein the first fastening arm is arranged at an outer side of the containing groove, and the retaining stage forms a retaining wall and the first fastening arm is fastened on the retaining wall, and wherein the assembling stage has a second fastening arm and the second fastening arm is an elastic arm, the second fastening arm is formed at one side edge of the first fastening arm to laterally fasten the retaining stage.

2. The windshield wiper combining assembly of claim 1, wherein the retaining stage perpendicularly extends a positioning block at a side edge of the cover cap, the second fastening arm is fastened on the positioning block.

3. The windshield wiper combining assembly of claim 2, wherein the second fastening arm has a positioning button, the positioning block has a positioning hole corresponded to the positioning button; wherein the retaining wall moves from an outer side of the first fastening arm to an inner side of the first fastening arm, the positioning button is fastened in the positioning hole and the retaining stage is positioned on the assembling stage.

4. The windshield wiper combining assembly of claim 3, wherein the assembling stage outwardly extends a first retaining wing from one side edge of the assembling stage, a first gap is formed between the first retaining wing and an outer surface of the assembling stage, the driven wiper arm has an extending arm corresponded to the first gap and the extending arm is inserted in parallel in the first gap.

5. The windshield wiper combining assembly of claim 4, wherein the first retaining wing has a first through hole corresponded to the containing groove.

6. The windshield wiper combining assembly of claim 5, wherein the assembling stage outwardly extends a second retaining wing from the other side of the assembling stage, a second gap is formed between the second retaining wing and the outer surface of the assembling stage, the driven wiper arm has a fastening frame corresponded to the second gap and one side edge of the fastening frame is inserted in parallel in the second gap.

7. The windshield wiper combining assembly of claim 6, wherein the second retaining wing has a second through hole corresponded to the containing groove.

8. The windshield wiper combining assembly of claim 3, wherein the retaining stage forms a cover plate on a bottom surface of the cover cap, the cover plate moves to one side edge of the containing groove when the cover cap presses on the containing groove, thus abutting the through shaft not to be loosened from the containing groove.

9. The windshield wiper combining assembly of claim 8, wherein the cover plate is arranged outside the retaining wall.

* * * * *